Dec. 10, 1935. O. C. RITZ-WOLLER 2,023,442
REFLECTOR
Filed Sept. 4, 1934
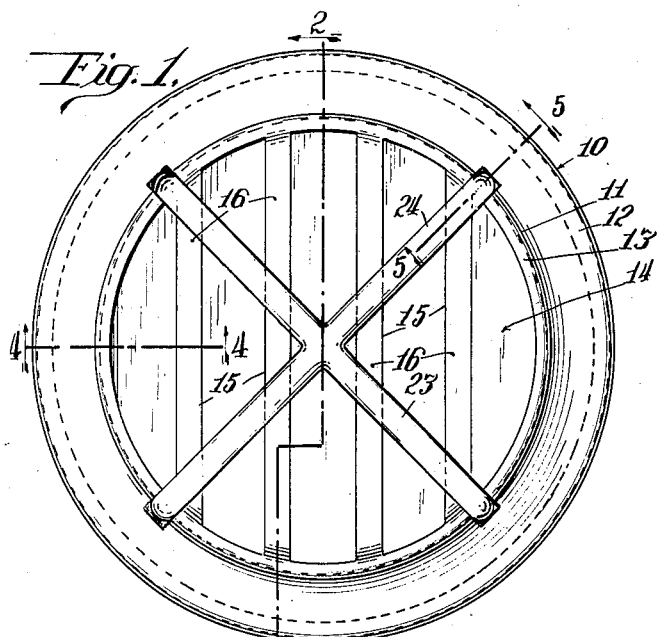
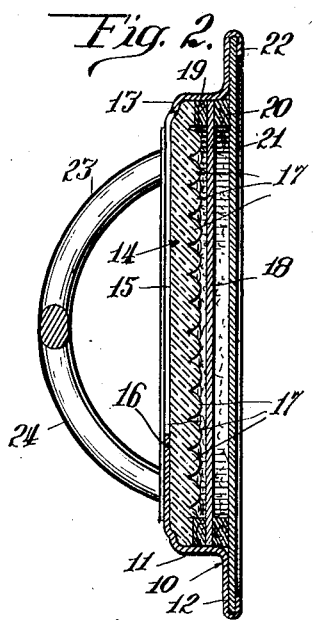
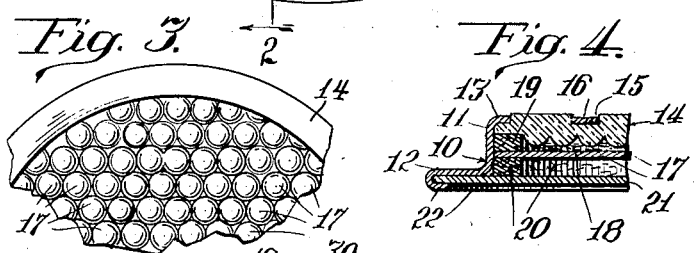
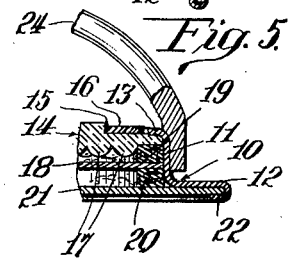
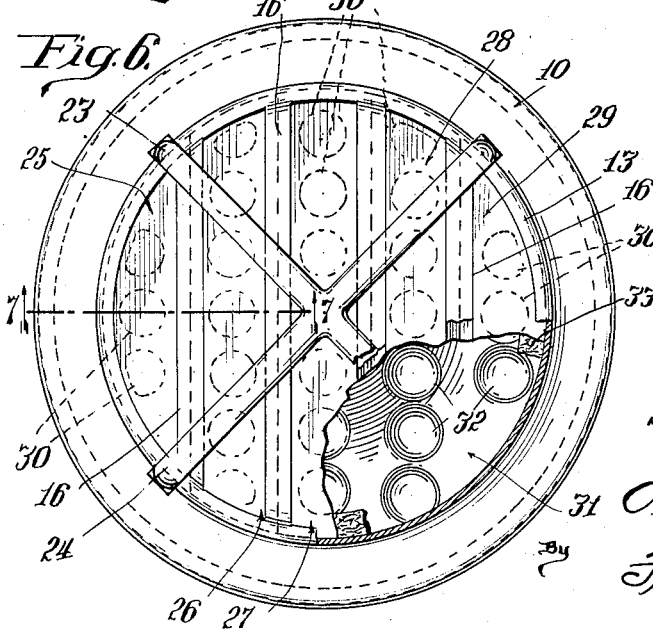
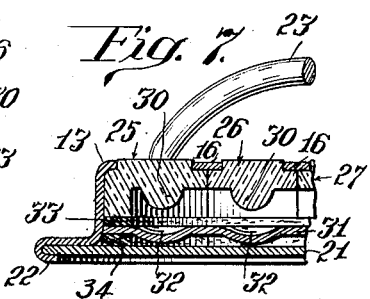
Inventor
Oliver C. Ritz-Woller
By Fricke & DeBeck
Attorneys Patented Dec. 10, 1935

2,023,442

UNITED STATES PATENT OFFICE 2,023,442

REFLECTOR

Oliver C. Ritz-Woller, Chicago, Ill.

Application September 4, 1934, Serial No. 742,597

7 Claims. (Cl. 88—82)

My invention relates to reflector devices such as are designed for use on the sides and ends of trucks and elsewhere for reflecting back to their source the rays of light from the headlights of approaching cars, and it has for its object the provision of a new and improved form and arrangement of parts by reason of which an improved reflection is obtained both to points on the axis of the reflectors and to points disposed at a slight angle transversely from such axis, by reason of which the lens shall be well protected against breakage, and by reason of which replacement in case of breakage may be readily made at a minimum of trouble and expense.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a front face view of the preferred form of my improved reflector device;

Fig. 2 is a central vertical section taken substantially at line 2—2 of Fig. 1;

Fig. 3 is a rear face view of a fragmentary portion of the form of lens as shown in Figs. 1 and 2;

Figs. 4 and 5 are cross sectional views taken at the line 4—4 and the line 5—5 of Fig. 1, respectively;

Fig. 6 is a front face view of a modified form of device, broken away at one side for clearness of illustration; and Fig. 7 is a cross sectional view taken at line 7—7 of Fig. 6.

Referring now particularly to Figs. 1 to 5, inclusive, in which corresponding parts are indicated by the same reference characters, 10 indicates a casing member in the form of a ring pressed from sheet metal, comprising a cylindrical body portion 11, and an outwardly extending flange portion 12. At its forward edge, the cylindrical portion 11 is turned inwardly to provide a narrow flange 13 against which a lens 14 of glass or other suitable material is positioned so as to fill the front opening across the ring 10. As is best shown in Figs. 1 and 4, the lens 14 is provided with a plurality of grooves or valleys 15 in its front face in which are located a plurality of bars 16 formed integrally with the ring 10, the bars 16 serving to protect the lens 14 to some extent from breakage and to hold the pieces in place within the casing should beakage occur.

As is best shown in Fig. 3, the rear face of the lens 14 is provided with a multiplicity of projections 17 which are substantially hemispherical in form, as is clearly shown in Figs. 2, 4 and 5. By reason of this rounded formation, a considerable portion of the light striking the lens from the front is reflected forwardly from the lens along lines substantially parallel with the lines of incidence of the rays.

For increasing the reflection, a reflector 18 is provided in rear of the lens in slightly spaced relation thereto, such reflector in the arrangement shown being in the form of a plate of aluminum having its front face polished for increasing its effectiveness as a reflector. In the arrangement shown, the reflector plate 18 is held in position with respect to the lens by a spacing ring 19, and is held in position in the casing by means of a spacing ring 20 and a closure plate 21, the closure plate being held in position by means of a flange 22 turned backwardly and inwardly about the edge portions of the plate 21, the flange 22 being formed on the outer edge of the flange portion 12 of the ring 10.

For providing additional protection for the lens 14, I have provided a plurality of bowed arms 23 and 24 which are secured at their outer ends to the cylindrical portion 11 of the ring 10 as is clearly shown in Fig. 5, being preferably secured in position by spot-welding. In the arrangement shown, the bowed members 23 and 24 are arranged at right angles to each other, being welded to each other at a point in front of the lens, being able thus to reenforce each other for the protection of the lens 14 from being damaged by a blow from the front.

By the use of my improved construction, effective reflection is brought about of the rays of light passing backwardly through the lens 14, the greater portion of such rays being reflected forwardly again through the lens and thence toward the source of the light. In the form of lens employed by me heretofore embodying my present invention and prepared upon a commercial basis without any effort at precision in their production, I have found in practice that sufficient of the light from a source directly in front of the lens is returned to the neighborhood of the source of light for enabling the presence of the lens to be detected clearly and the color of the lens to be determined clearly by an observer at a considerable distance from the lens. The same is true to an effective degree when the source of light and the observer are at a consderable angle from the axis of the lens, up to 30°, or perhaps more.

Referring now to the form of device as shown in Figs. 6 and 7, it will be seen that a ring 10 similar to that above described is used for the casing member, closed at its rear face by a plate 21 held in position by a flange 22. The casing is provided with protecting arms 23 and 24 as above described.

In the arrangement shown in Figs. 6 and 7, a plurality of lens members 25, 26, 27, 28 and 29 are employed, each in the form of a strip of glass or other suitable material and each having a plurality of substantially hemispherical projections 30 on its rear face, such projections 30 in the arrangement shown being of considerably greater size than that of the projections 17 of the form shown in Figs. 1 to 5. The strips making up the complete lens structure are positioned side by side across the opening of the casing 10, the several strips having contact with each other underneath the bars 16, as is clearly shown in Fig. 7. A reflector plate 31 is employed in spaced relation to the hemispherical projections 30, such reflector 31 being preferably in the form of an aluminum plate having concaved portions 32 directly behind the projections 30, the concaved portions 32 being formed upon a greater radius than that of the projections 30. The lens members 25, 26, 27, 28 and 29 are spaced from the reflector plate 31 by means of a spacing ring 33 and the reflector 31 is spaced from the closure plate 21 by means of a spacer ring 34.

As will be readily understood, when one of the strips comprising the lens structure of the arrangement shown in Figs. 6 and 7 becomes broken, such breakage is likely to be restricted to a single one or possibly two of the strips, leaving the remaining strips intact. After such breakage the remaining portions of the lens operate just as efficiently as before. In case a replacement becomes necessary or advisable, the replacement can be effected without the necessity for the provision of a lens covering the complete opening of the casing member.

While I prefer to employ the form of device as shown in my drawing and as above described, it is to be understood that my invention is not limited to such form except so far as the claims may be so limited by the prior art.

I claim:—

1. A device of the type described, comprising in combination a casing having a front opening and having bars extending in spaced relation to each other across said opening, a lens fitted in said opening and grooved in its front face to receive said bars, means in rear of said lens for reflecting forwardly rays of light passing backwardly through the lens, and means comprising a plurality of heavy bars secured to said casing and positioned in spaced relation thereto opposite said lens for protecting the lens from damage.

2. A device of the type described, comprising in combination a casing having a front opening and having bars extending in spaced relation to each other across said opening, lens means fitted in said opening and grooved in its front face to receive said bars, and reflector means in rear of said lens means for reflecting forwardly rays of light passing backwardly through the lens means.

3. A device of the type described, comprising in combination a casing having a front opening and having bars extending in spaced relation to each other across said opening, lens means fitted in said opening and having portions extending forwardly between said bars, and reflector means in rear of said lens means for reflecting forwardly rays of light passing backwardly through the lens means.

4. A device of the type described, comprising in combination a casing having a front opening and having bars extending in spaced relation to each other across said opening, lens means fitted in said opening and provided with valleys to receive said bars, said lens means having a multiplicity of substantially hemispherical projections on one of its faces arranged in rows in line with the respective spaces between said bars, and reflector means within said casing and comprising concaved portions in rear of and in line with said respective projections for reflecting forwardly rays of light passing backwardly through the lens means.

5. A device of the type described, comprising in combination a casing having a front opening and having bars extending in spaced relation to each other across said opening, lens means fitted in said opening and having valleys in which said bars are disposed, said lens means having a multiplicity of substantially hemispherical projections on one of its faces arranged in rows in line with the respective spaces between said bars, and reflector means within said casing and comprising concaved portions in rear of said respective projections and of greater radii than said projections for reflecting forwardly rays of light passing backwardly through the projections.

6. A device of the type described, comprising in combination a casing having a front opening and having bars extending in spaced relation to each other across said opening, lens means fitted in said opening and provided with valleys to receive said bars, said lens means having a multiplicity of substantially hemispherical projections on its rear face, a reflector plate in rear of said lens means in spaced relation thereto and having a concaved portion directly in rear of each of said projections and of a greater radius than said projections for reflecting forwardly rays of light passing backwardly through the lens means, and means for holding said lens means and said reflector plate in fixed position in said casing.

7. A device of the type described, comprising in combination a casing having a front opening and having bars extending in spaced relation to each other across said opening, a plurality of lenses each in the form of a strip, said strips being fitted in said opening side by side with adjacent edges in abutting relation and under said respective bars, each of said strips having a plurality of projections on one of its faces arranged in a row in line with the space occupied by it between the adjacent bars, means in rear of said projections for reflecting forwardly rays of light passing backwardly through the projections, and means for closing the rear side of said casing and for holding said strips and reflector means firmly in position therein.

OLIVER C. RITZ-WOLLER.